US006993565B1

(12) United States Patent
Ohashi

(10) Patent No.: US 6,993,565 B1
(45) Date of Patent: Jan. 31, 2006

(54) SERVICE PROCESSOR CONTROL SYSTEM AND COMPUTER-READABLE RECORDING MEDIUM RECORDING SERVICE PROCESSOR CONTROL PROGRAM

(75) Inventor: Tadashi Ohashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 669 days.

(21) Appl. No.: 09/697,183

(22) Filed: Oct. 27, 2000

(30) Foreign Application Priority Data

Mar. 13, 2000 (JP) ............................. 2000-069385

(51) Int. Cl.
*G06F 15/16* (2006.01)
*G06F 15/167* (2006.01)
*G06F 15/177* (2006.01)

(52) U.S. Cl. ...................... 709/208; 709/203; 709/209; 709/217; 709/218; 709/219; 709/220; 709/221; 715/500.1; 715/733; 715/900

(58) Field of Classification Search ................ 717/173, 717/170, 176, 114; 709/246, 218, 203, 223, 709/208, 209, 217–219, 220–221; 715/500.1, 715/500, 733, 900
See application file for complete search history.

(56) References Cited

U.S. PATENT DOCUMENTS

| | | | | |
|---|---|---|---|---|
| 5,950,173 A | * | 9/1999 | Perkowski | 705/26 |
| 6,012,098 A | * | 1/2000 | Bayeh et al. | 709/246 |
| 6,108,712 A | * | 8/2000 | Hayes, Jr. | 709/246 |
| 6,131,116 A | * | 10/2000 | Riggins et al. | 709/219 |
| 6,138,150 A | * | 10/2000 | Nichols et al. | 709/219 |
| 6,144,990 A | * | 11/2000 | Brandt et al. | 709/203 |
| 6,151,708 A | * | 11/2000 | Pedrizetti et al. | 717/173 |
| 6,173,316 B1 | * | 1/2001 | De Boor et al. | 709/218 |
| 6,209,124 B1 | * | 3/2001 | Vermeire et al. | 717/114 |
| 6,374,296 B1 | * | 4/2002 | Lim et al. | 709/229 |
| 6,389,589 B1 | * | 5/2002 | Mishra et al. | 717/170 |
| 6,539,422 B1 | * | 3/2003 | Hunt et al. | 709/217 |
| 6,546,554 B1 | * | 4/2003 | Schmidt et al. | 717/176 |

* cited by examiner

*Primary Examiner*—Saleh Najjar
*Assistant Examiner*—B R Bruckart
(74) *Attorney, Agent, or Firm*—Staas & Halsey LLP

(57) ABSTRACT

Service processor control has enhanced versatility by delivering and maintaining component information with less labor and lower cost. A system includes a client storing component information on all hardware and firmware constituting a product (with the client connected to a drawing server), an EC sheet server, a program server, a manual server, and a service processor connected to the Internet. The service processor has a console function for at least the service processor, extracting component information through an SVP browser, and allowing the service processor to conduct a maintenance service, and further includes a console service and the like relating to a host.

9 Claims, 7 Drawing Sheets

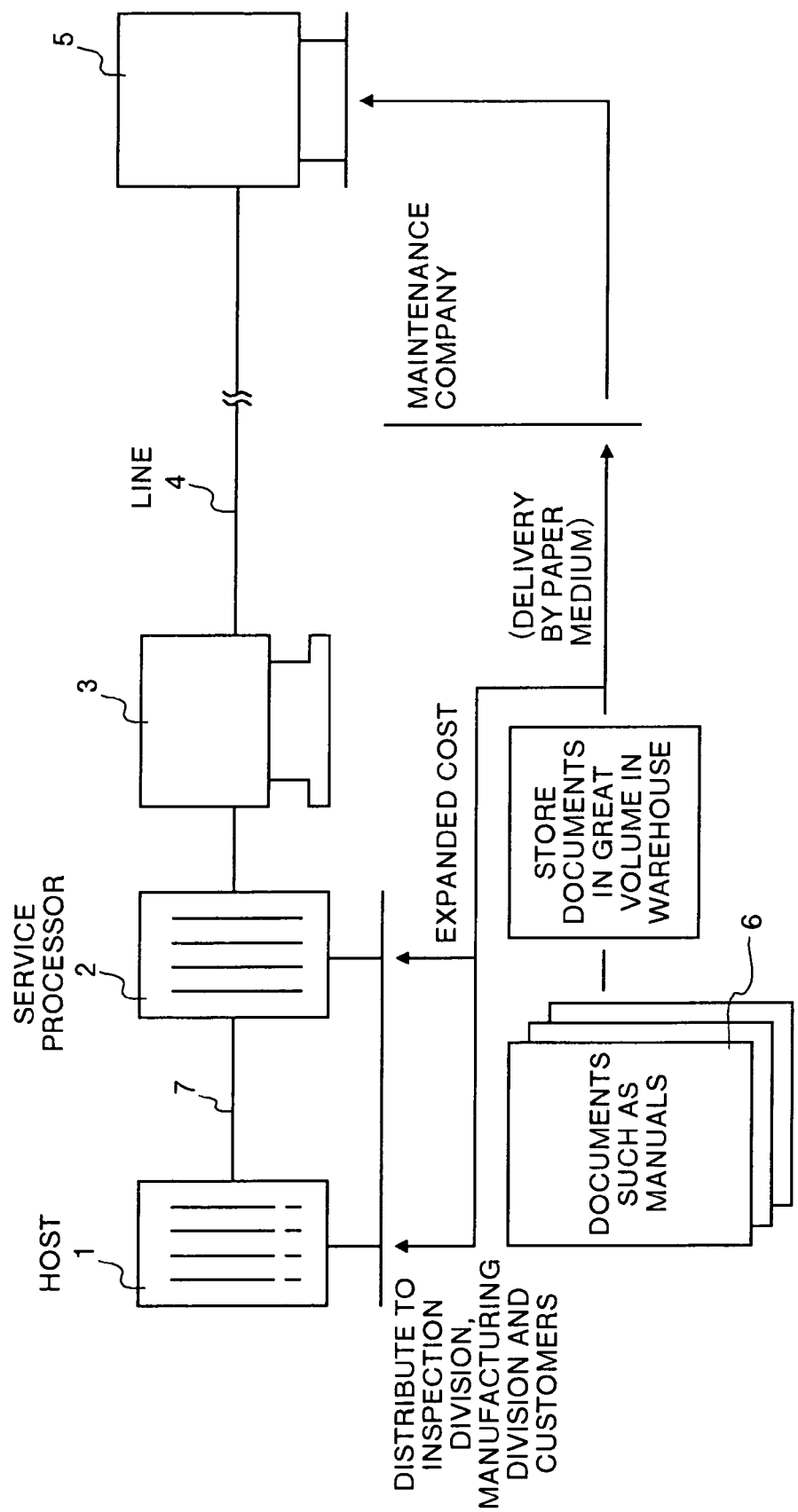

SERVICE PROCESSOR CONTROL SYSTEM AND COMPUTER-READABLE RECORDING MEDIUM RECORDING SERVICE PROCESSOR CONTROL PROGRAM

FIELD OF THE INVENTION

The present invention relates to a service processor control system for extracting component information on all the hardware and firmware constituting a product through the Internet and to a computer-readable recording medium recording a service processor control program.

BACKGROUND OF THE INVENTION

Conventionally, at manufacturers-side involved in the manufacture of apparatuses/units, various codes relating to firmware and documents relating to firmware and hardware are generated in a series of processes including a development process, a design process, a production process, an inspection process, a shipment process, a delivery and installation process and a user-side operation and maintenance process, and it takes considerable labor and cost for delivery and maintenance. Thus, means and methods for effectively overcoming these disadvantages are strongly desired.

As described above, at manufacturers-side, various codes and documents are conventionally generated in a series of processes including a development process, a design process, a manufacturing process, an inspection process, a shipment process, a delivery and installation process and a user-side operation and maintenance process. The various codes relating to firmware includes a source code, an object code, patch data, hardware state setting information on a host (or server, etc.) subjected to a maintenance service for the service processor and the like.

The documents include manuals, specifications, design drawings, EC sheets (a new design notice, a design modification notice) and the like relating to firmware, hardware and the like. It is assumed here that the documents 6 shown in FIG. 7 include all paper mediums such as the above-described manuals, specifications, design drawings and EC sheets. As shown in FIG. 7, the documents 6 in great volume are conventionally stored in a warehouse and delivered, if necessary, to an inspection division, a manufacturing division, customers, a maintenance company and the like. Further, the parties which received the documents 6 read the documents by visual observation.

Likewise, the source codes, object codes relating to firmware, hardware state setting information on a host (or a server, etc.) to which a service processor maintenance service is conducted, and the like are distributed by hand to related divisions, a maintenance company and the like. Further, at the manufacture side, there are installed a host 1 such as a mainframe used in various processings, a service processor 2 and a console 3. The service processor 2 is a computer serve system independent of the host 1. The service processor 2 controls the hardware of the host 1, provides conversational means for conversation with an operating system, monitors and diagnoses the operation state of the host 1 and the like.

The console 3 is a specific terminal for issuing commands to the service processor 2 and is operated by an operator. A remote maintenance terminal 5 is installed at a maintenance company side and connected to the console 3 (service processor 2) through a line 4. The remote maintenance terminal 5 conducts a remote maintenance through the line 4.

Meanwhile, it has been conventionally necessary to deliver source codes and object codes of the firmware developed by the design division and the documents 6 (see FIG. 7) (which will be referred to as "component information" hereinafter) one by one. Due to this, it disadvantageously takes considerable labor and cost for delivery and maintenance. In case of the documents 6, in particular, it disadvantageously takes considerable labor and cost for the preparation and creation of materials, the creation of block copies, maintenance, delivery and the like.

Moreover, the console 3 has been conventionally connected to the service processor 2 (host 1) as a part of the system. For that reason, only the console 3 can execute control over the service processor 2, which makes the system disadvantageously less versatile.

SUMMARY OF THE INVENTION

It is, therefore, an object of the present invention to provide a service processor control system and a computer-readable recording medium recording a service processor control program capable of delivering and maintaining component information with less labor and lower cost and capable of realizing enhanced versatility relating to service processor control.

To obtain the above object, the invention according to a first aspect comprises, a drawing server 30, an EC sheet server 40, a program server 50 and a manual server 60 in one embodiment to be described later) storing component information on all of hardware and firmware constituting a product, control information for controlling at least a hardware state of a host and setting information for setting the hardware state, and connected to the Internet; and a client (corresponding to a client 80 and a client 10 in one embodiment to be described later) connected to a service processor connected to the host and the Internet, having at least a maintenance service function, as a console function for the service processor, based on the control information and the setting information, and drawing the component information, the control information and the setting information through a browser.

According to this invention, the client having the console function for the service processor and connected to the Internet is provided, and component information, control information and setting information are extracted through the browser. Thus, compared with a conventional case where component information is delivered and maintained by paper mediums and the like, delivery and maintenance can be conducted with less labor and lower cost and latest component information can be easily obtained due to the interactive characteristics of the Internet. Further, according to this invention, it is not necessary to store conventionally-used paper mediums in great volume in a warehouse and it is, therefore, unnecessary to dispose of bad resources of paper mediums.

The invention according to a second aspect is based on the service processor control system according to the first aspect, wherein the client executes control relating to the service processor through the browser, thereby setting and controlling the hardware state of the host based on the control information and the setting information.

According to this invention, the client provided with the browser instead of the conventional console 3 sets and controls the hardware state of the host. This can enhance versatility with respect to service processor control.

The invention according to a third aspect is based on the service processor control system according to the first or the second aspect, wherein the component information, the control information and the setting information are described in XML and the browser is made to correspond to the XML.

According to this invention, component information is described in XML. Due to the characteristics of XML, therefore, various types of component information can be easily structuralized.

The invention according to a fourth aspect is based on the service processor control system according to any one of the first to the third aspects, wherein another client connected to the Internet is also provided with the browser.

According to this invention, by providing another client connected to the Internet with a browser, control relating to the service processor can be executed by another client through the Internet.

The invention according to a fifth aspect is based on the service processor control system according to any one of the first to the fourth aspects wherein the client executes control over information on the service processor using the XML including a tag for defining a type of information on the hardware of the host by DTD.

According to this invention, service processor information control is executed using the XML defining an information type (e.g., binary, hexadecimal, decimal) by DTD. Thus, the use of XML can be extended to an information processing.

The invention according to a sixth aspect is based on the service processor control system according to any one of the first to the fifth aspects wherein the client displays the hardware state by a predetermined type of information by using the DTD and DSSSL.

According to this invention, the hardware state of the host is displayed by a predetermined type of information by using DTD and DSSSL. Thus, the use of XML can be extended to display control relating to the service processor.

The invention according to a seventh aspect is based on the service processor control system according to the sixth aspect wherein the client writes the setting information of a predetermined type into the hardware of the host by using the DTD and DSSSL.

According to this invention, the setting information of a predetermined type is written into the hardware of the host by using DTD and DSSSL. Thus, the use of XML can be extended to control for writing information into the hardware.

The invention according to an eighth aspect is based on the service processor control system according to the sixth aspect wherein the client displays a message from the host by scrolling up or down the message by using the DTD or DSSSL.

According to this invention, the message from the host is displayed while being scrolled up or down by using DTD and DSSSL. Thus, the use of XML can be extended to host message display control.

The invention according to a ninth aspect is based on the service processor control system according to the first to the eighth aspects wherein the service processor control system comprises a program server connected to the Internet, storing a program, a loading module for loading the program and control information for controlling execution of the program; and the client extracts the program, the loading module and the control information by way of the browser through the Internet and then executes the program.

According to this invention, a program, a loading module and control information are extracted from the program server by way of the browser corresponding to XML through the Internet. Thus, compared with a conventional case, the execution of the program can be conducted at low cost, instantly and easily.

The invention according to a tenth aspect is a computer-readable recording medium recording a service processor control program, connected to a service processor and adapted to a client connected as a console for at least the service processor, the service processor connected to a component information server storing component information on all hardware and firmware constituting a product, control information for controlling at least a hardware state of a host and setting information for setting the hardware state through the Internet and connected to the host, wherein the computer-readable recording medium allows a computer to execute an extraction step of extracting the component information, the control information and the setting information through a browser.

According to this invention, component information, control information and setting information are extracted through the browser. Thus, compared with a conventional case where component information is delivered and maintained by paper mediums and the like, delivery and maintenance can be conducted with less labor and lower cost and latest component information can be easily obtained due to the interactive characteristics of the Internet. Further, according to this invention, it is not necessary to store conventionally-used paper mediums in great volume in a warehouse and it is, therefore, unnecessary to dispose of bad resources of paper mediums.

The invention according to an eleventh aspect is based on the computer-readable recording medium recording a service processor control program according to the tenth aspect, wherein the computer-readable recording medium comprises a control execution step of setting and controlling the hardware state of the host based on the control information and the setting information by executing control relating to the service processor through the browser.

According to this invention, control relating to the service processor is conducted through the browser instead of the conventional console. Thus, versatility relating to service processor control can be enhanced.

The invention according to a twelfth aspect based on the computer-readable recording medium recording a service processor control program according to the tenth or the eleventh aspect comprises an information control execution step of executing control over information on the service processor by using an XML including a tag defining a type of hardware information on the host by DTD.

According to this invention, service processor information control is executed using the XML defining an information type (e.g., binary, hexadecimal, and decimal) by DTD. Thus, the use of XML can be extended to an information processing.

Other objects and features of this invention will become understood from the following description with reference to the accompanying drawings.

BRIEF DESCRIPTION OF THE DRAWINGS

FIG. 7 is a block diagram showing a conventional constitution.

DESCRIPTION OF THE PREFERRED EMBODIMENTS

Description will be given hereinafter to one embodiment of a service processor control system and a computer-readable recording medium recording a service processor control program according to the present invention with reference to the accompanying drawings.

Figure 1:
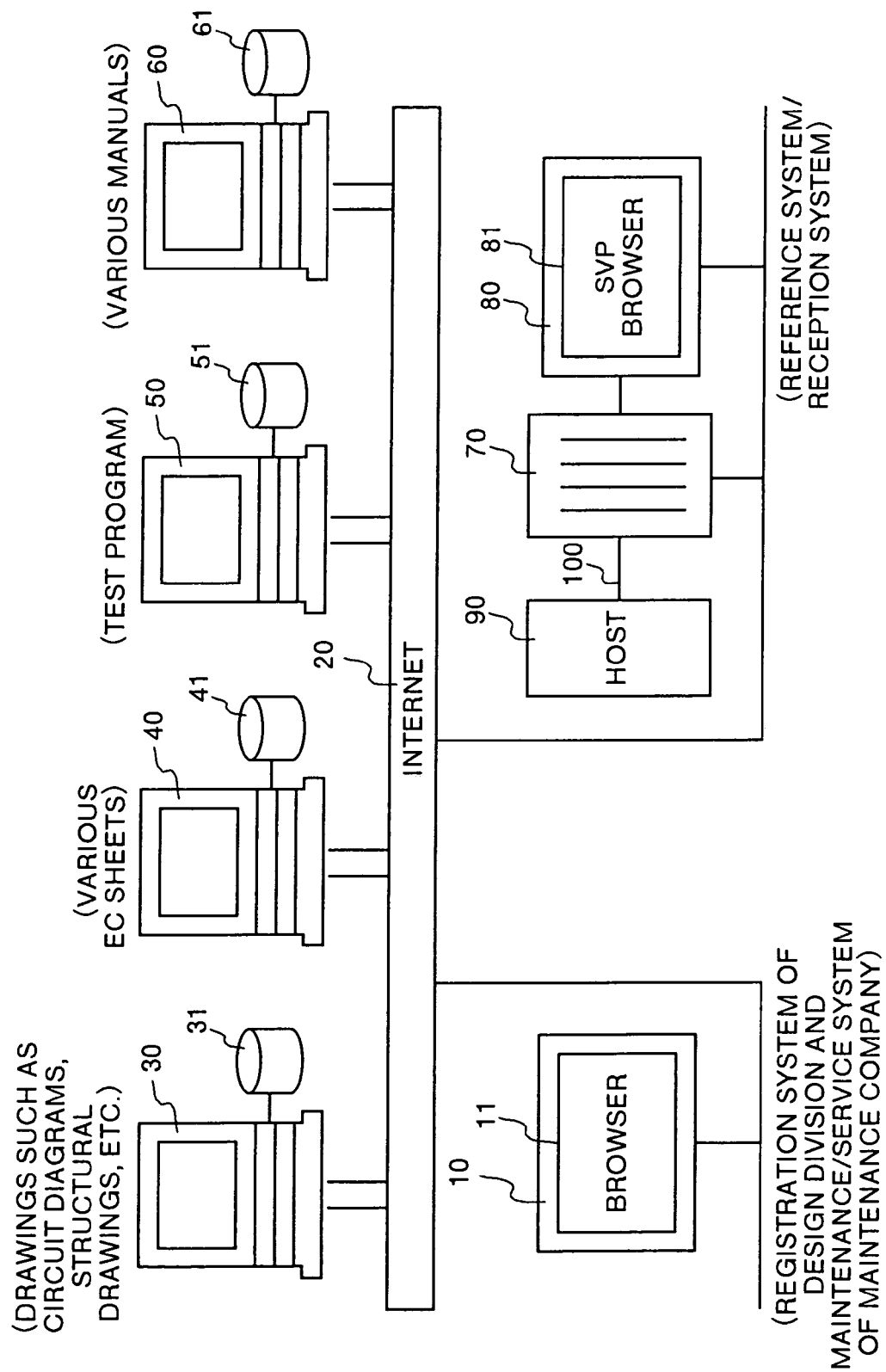
FIG. 1 is a block diagram showing the constitution of one embodiment according to the present invention.

FIG. 1 is a block diagram showing the constitution of one embodiment according to the present invention. In FIG. 1, a client 10 is a terminal for registering electronic information on drawings such as circuit diagrams and structural drawings generated in a series of processes including a development process, a design process, a manufacturing process, an inspection process and a shipment process, information on various EC sheets (a new design notice, a design modification notice and the like), program information and electronic information on various manuals. The client 10 is connected to the Internet 20. In this client 10, a browser 11 for perusing information described in XML (Extensive Markup Language) is started. Electronic information on diagrams, various EC sheets and various manuals, and program information as stated above will be generally referred to as "component information" hereinafter.

A diagram server 30 is connected to the Internet 20 and is provided with a storage device 31. This storage device 31 stores therein electronic information, described in XML, on drawings such as circuit diagrams and structural drawings. An EC sheet server 40 is connected to the Internet 20 and is provided with a storage device 41. This storage device 41 stores therein electronic information, described in XML, on various EC sheets. A program server 50 is connected to the Internet 20 and is provided with a storage device 51. This storage device 51 stores therein an inspection program and the like. A manual server 60 is connected to the Internet 20 and is provided with a storage device 61. This storage device 61 stores therein electronic information, described in XML, on various manuals.

A service processor 70 is connected to the Internet 20 and a client 80. The service processor 70 is a computer subsystem independent of a host 90 (or server, etc.). The service processor 70 controls hardware, provides conversational means for conversation with an operating system, monitors and diagnoses the operation state of the host 90. This service processor 70 is connected to the host 90 through a bus 100 for scan-in and scan-out to the host 90.

The client 80 is connected to the Internet 20 and the service processor 70. In this client 80, an SVP (Service Processor) browser 81 is started. This client 80 corresponds to the conventional console 3 (see FIG. 7) and conducts a maintenance service and the like to the host 90. Further, the client 80 is allowed to refer to or register information on drawings, various sheets and the like through the Internet 20 by using an SVP browser 81. Further, an IP address, an SMTP address and an FTP address are added to the client 80 (SVP browser 81). The client 80 is, therefore, capable of establishing communications through the Internet 20.

Next, the operation of one embodiment stated above will be described with reference to the flow charts of FIGS. 2 to 6. In a state shown in FIG. 1, in which the browser 11 and the SVP browser 81 are started, respectively, the displays of the clients 10 and 80 display menus for selecting events (registration, reference, reception, . . . , and loading browser.

Here, if "registration" is selected while the browser 11 of the client 10 is started, the client 10 outputs the determination result of a step SA1, "Yes". In a step SA8, the client 10 registers electronic information on drawings such as circuit diagrams and structural drawings, information on various EC sheets (a new design notice, a design modification notice), program information or electronic information on various manuals in the drawing server 30, the EC sheet server 40, the program server 50 or the manual server 60 through the Internet 20.

Figure 2:
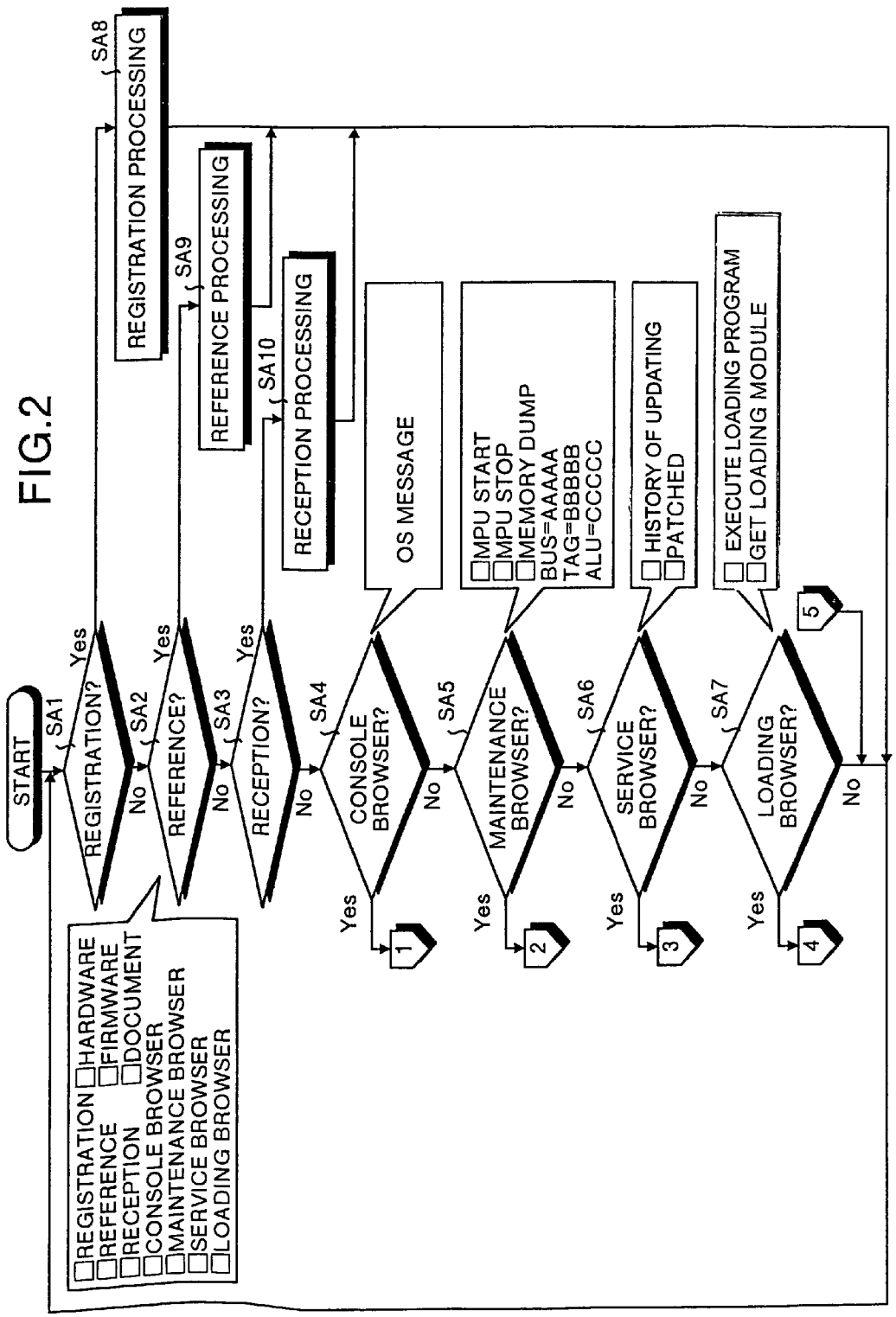
FIG. 2 is a flow chart for describing overall processings of this embodiment.

In case of registering hardware information, "registration" and "hardware" shown in FIG. 2 are selected. By doing so, hardware information on drawings, various EC sheets and various manuals are registered. In case of registering firmware information, "registration" and "firmware" shown in FIG. 2 are selected. By doing so, firmware information on various EC sheets, programs and various manuals are registered.

Further, if "reference" shown in FIG. 2 is selected while the SVP browser 81 of the client 80 is started, the client 80 outputs the determination result of a step SA2, "Yes". In a step SA9, the client 80 extracts electronic information on drawings such as circuit diagrams and structural drawings, information on various EC sheets (a new design notice, a design modification notice), program information and electronic information on various manuals from the drawing server 30, the EC sheet server 40, the program server 50 and the manual server 60. These pieces of information are then displayed by the SVP browser 81, thereby executing a reference processing.

In case of referring to hardware information, "reference" and "hardware" shown in FIG. 2 are selected. By doing so, hardware information on drawings, various EC sheets and various manuals are referred to. In case of referring to firmware information, "reference" and "firmware" shown in FIG. 2 are selected. By doing so, firmware information on various EC sheets, programs and various manuals are referred to.

If "reception" shown in FIG. 2 is selected while the SVP browser 81 of the client 80 is started, the client 80 outputs the determination result of a step SA3, "Yes". In a step SA10, the client 80 extracts electronic information on drawings such as circuit diagrams and structural drawings, information on various EC sheets (a new design notice, a design modification notice and the like), program information and electronic information on various manuals from the drawing server 30, the EC sheet server 40, the program server 50 and the manual server 60 through the VP browser 81, receives these pieces of information and then stores the information in a storage device (not shown).

In case of receiving hardware information, "reception" and "hardware" shown in FIG. 2 are selected. By doing so, hardware information on drawings, various EC sheets and various manuals are received. In case of receiving firmware information, "reception" and "firmware" shown in FIG. 2 are selected. By doing so, firmware information on various EC sheets, programs and various manuals are received.

Figure 3:
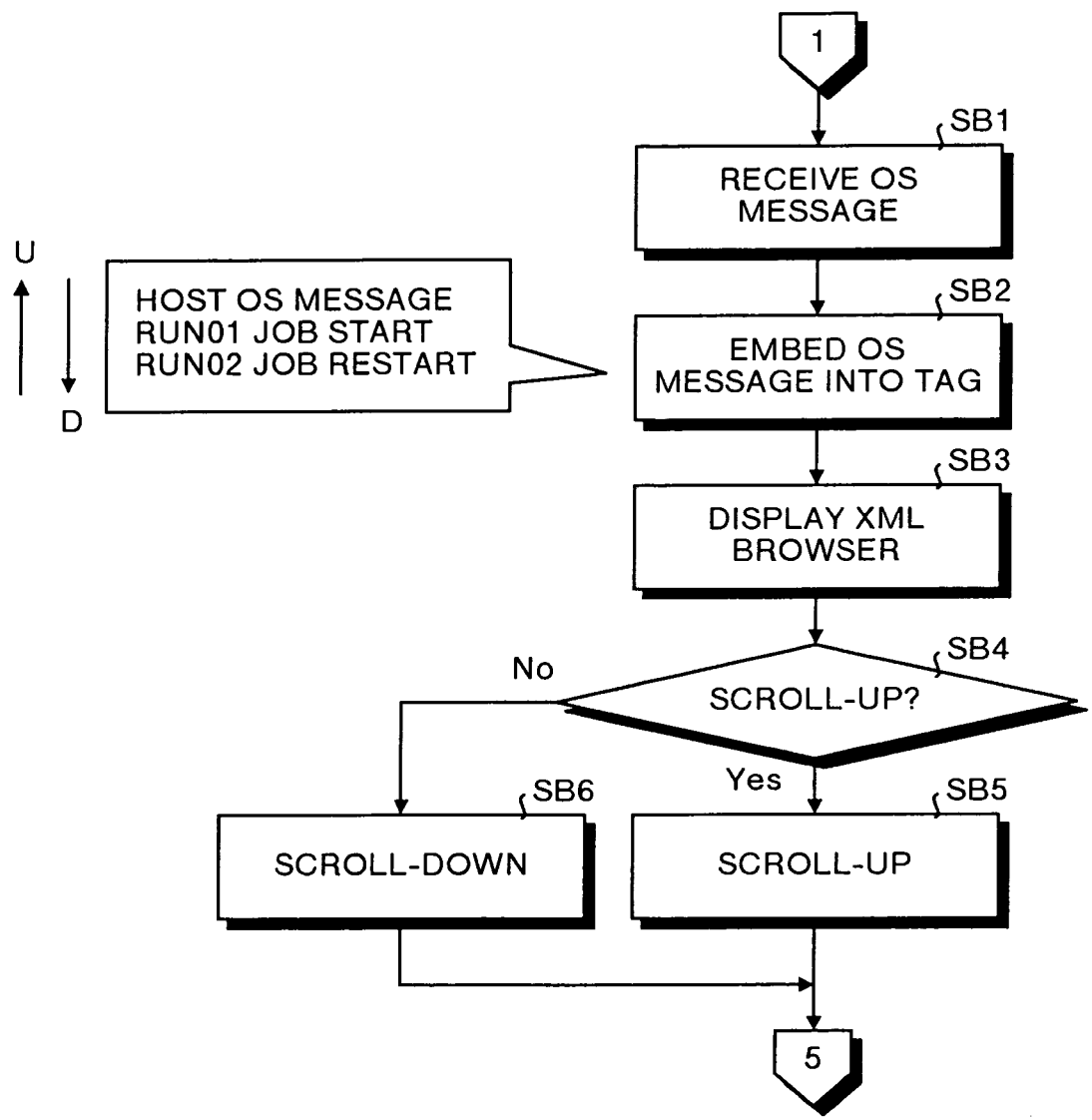
FIG. 3 is a flow chart for describing a console browser processing in this embodiment.

Further, if "console browser" is selected, the client 80 outputs the determination result of a step SA4 shown in FIG. 2, "Yes", and executes a console browser processing shown in FIG. 3. In this console browser processing, the client 80 (SVP browser 81) functions as a console for the service processor 70. In a step SB1, the client 80 receives an OS message from the OS (operating system) of the host 90 through the service processor 70. OS messages include "HOST OS MESSAGE", "RUN01 JOB START", "RUN02 JOB RESTART" and the like.

In a step SB2, the client 80 embeds the received OS message into an XML tag. If "HOST OS MESSAGE", for example, is received, the message is embedded like <PD>HOST OS MESSAGE</PD>. <PD> is a tag which means scrolling down the OS message from up to down direction (D direction) on one-line basis. If scrolling up an OS message from down to up direction (U direction) on one-line basis, a tag <PU> is used.

In a step SB3, the OS message is displayed on the SVP browser 81. In a step SB4, the tag is checked to thereby judge whether or not scroll is scroll-up. In that case, a determination result is set "No" to provide <PD> (scroll-down) tag. In a step SB6, the OS message is scrolled down in D direction on the SVP browser 81. If the determination result of the step SB4 is "Yes", the OS message is scrolled up in U direction in a step SB5.

Figure 4:
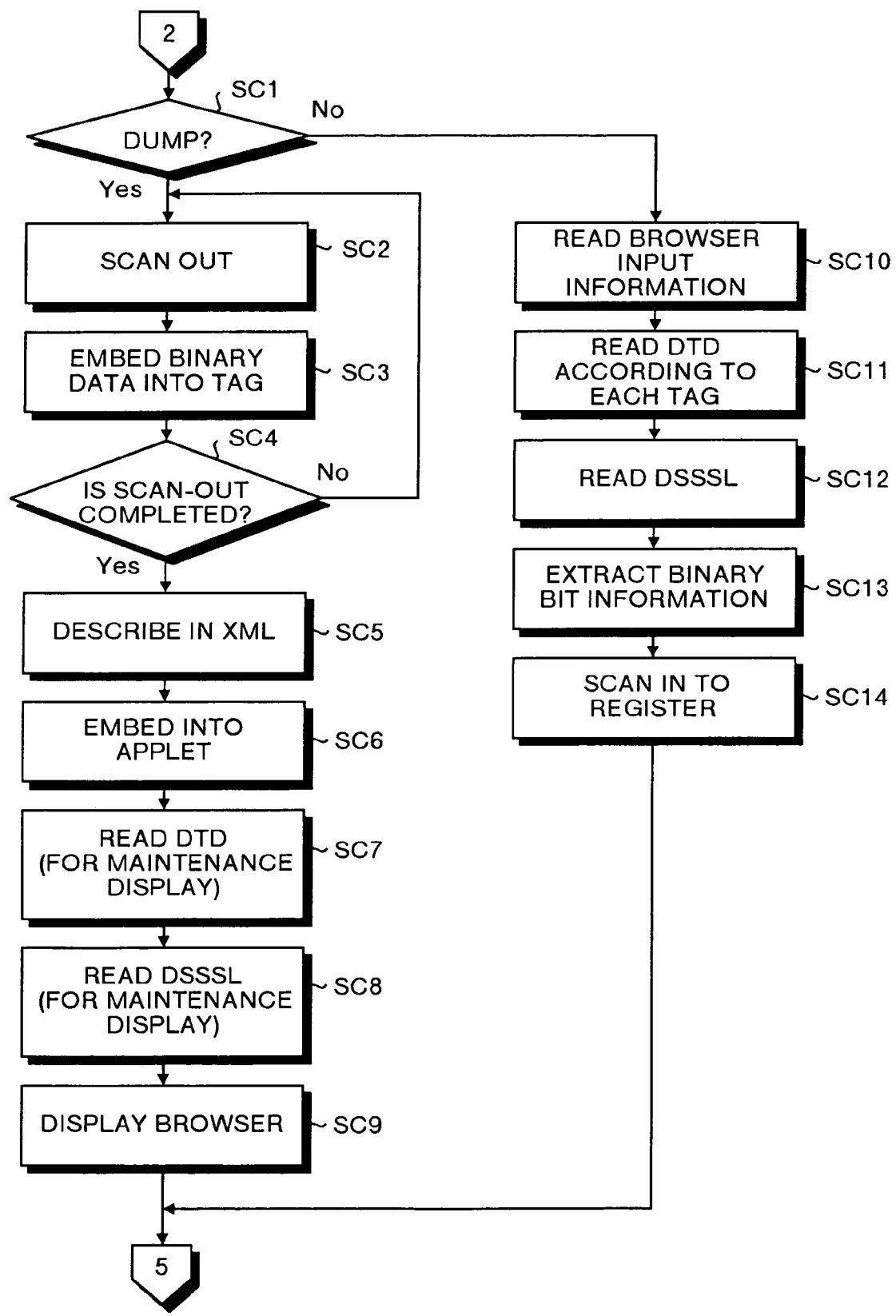
FIG. 4 is a flow chart for describing a maintenance browser processing in this embodiment.

Further, if "maintenance browser" is selected, the client 80 outputs the determination result of the step SA5 shown in FIG. 2, "Yes", and executes a maintenance browser processing shown in FIG. 4. In this maintenance browser, the client 80 (SVP browser 81) functions to maintain the service processor 70. In that case, a select picture plane for selecting a maintenance item ("MPU START", "MPU STOP", "MEMORY DUMP" or the like) is displayed on the SVP browser 81.

In a step SC1 shown in FIG. 4, it is judged whether or not DUMP ("MEMORY DUMP" stated above) has been selected. If this determination result is "Yes", the scan-out of a hardware register in the service processor 70 is executed in a step SC2 and binary data is acquired. In a step SC3, the client 80 embeds the acquired binary data into an XML tag. In this case, the tag means that the data is binary data. In a step SC4, it is judged whether or not scan-out has been completed. If the determination result is "No", processings after the step SC2 are repeated.

If the determination result of a step SC4 is "Yes", the client 80 describes scan or log information in XML in a step SC5. In a step SC6, the client 80 embeds the information embedded into the tag in the step SC3 and the XML information in the step SC5 into an applet.

In a step SC7, the client 80 reads DTD (Document Type Definition) for maintenance display from a storage device (not shown. This DTD defines a tag described in XML. The DTD is stored in the storage device in advance. In a step SC8, the client 80 reads DSSSL (Document Style Semantics and Specification Language) from the storage device (not shown). The DSSSL defines the document style correspond to XML. In a step SC9, the scanned-out binary data, log information (XML information) and the like are displayed on the SVP browser 81 according to the DSSSL.

On the other hand, if the determination result of the step SC1 is "No", scan-in to a register in the service processor 70 is executed in steps SC10 to SC14. Namely, in the step SC10, to-be-scanned-in browser input information (e.g., binary data) described through SVP browser 81 in XML is read (inputted) into the register in the service processor 70. Accordingly, the above-stated information is embedded into the XML tag.

The browser information include hexadecimal description data, decimal data and the like besides binary data (binary description data). In case of the binary data, the XML tag is <B>binary description</B>. In case of the hexadecimal data, the XML tag is <HEX>/hexadecimal data</HEX>. In case of decimal data, the XML tag is <DEC>/decimal description</DEC>.

In the step SC11, the client 80 reads the DTD according to each tag of the browser input information from the storage device (not shown). This DTD defines the tag of browser input information. "TAG BUS=X' 44BF FFFF' (HEX)" is an example of this DTD. This means that "TAG BUS" is associated with "44BF FFFF" in hexadecimal description.

In the step SC12, the client 80 reads DSSSL corresponding to the browser input information from the storage device (not shown). In the step SC13, binary bit information is extracted from the DTD. To be specific, "0100(4) 0100(4) 1011(B) 1111(F) 1111(F) 1111(F) 1111(F) 1111(F)" (binary bit information) is extracted from "44BF FFFF" (hexadecimal). In the step SC14, the client 80 scans in the binary bit information (binary data) to a target register (e.g., TAG BUS) of the service processor 70.

Figure 5:
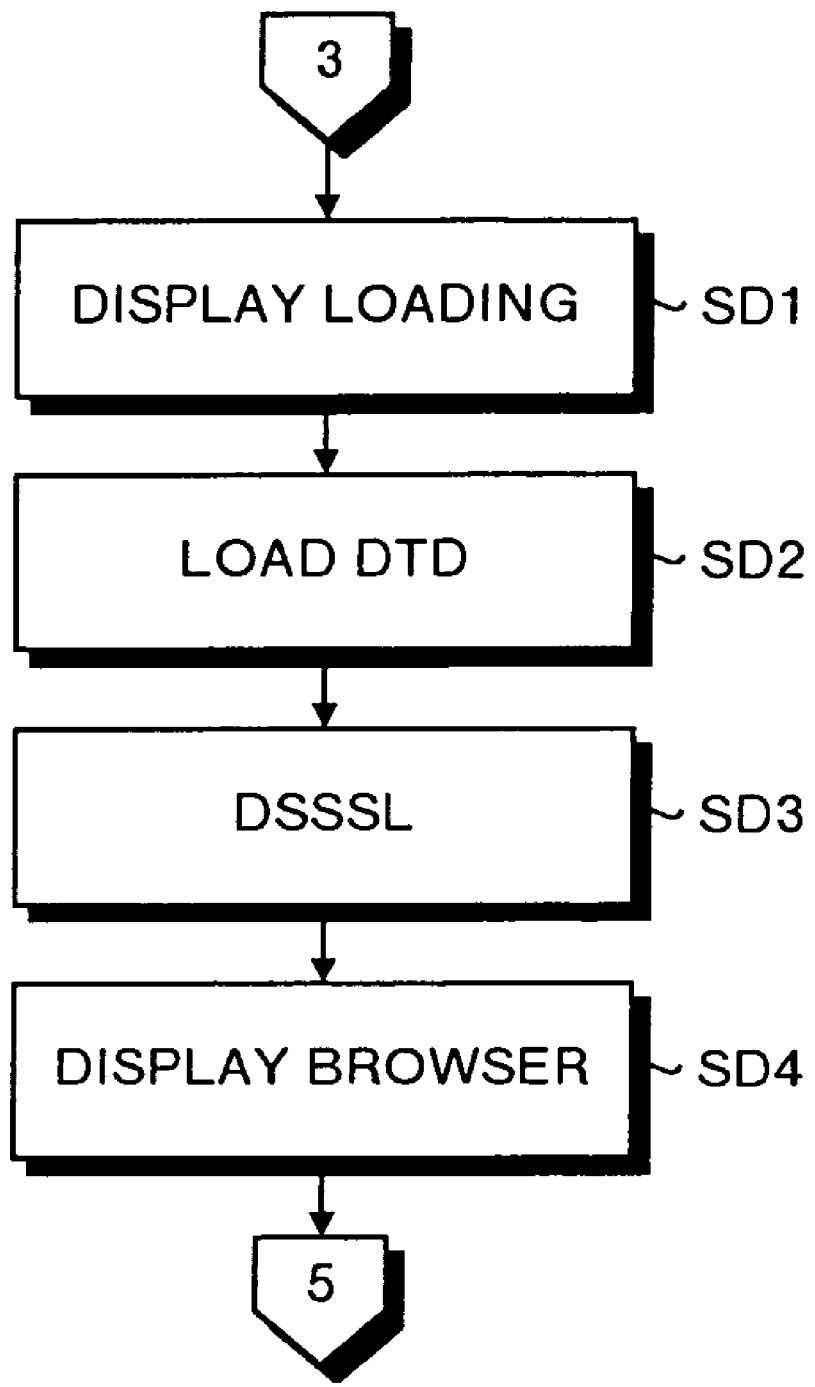
FIG. 5 is a flow chart for describing a service browser processing in this embodiment.

Further, if "service browser" is selected, the client 80 outputs the judgement result of the step SA6 shown in FIG. 2, "Yes", and executes a service browser processing shown in FIG. 5. In this service browser processing, the client 80 (SVP browser 81) functions as a console for the service processor 70, and displays update information and patch information on the service processor 70 as well as information for maintaining the service processor and the like (all of which information are described in XML). These pieces of service information are stored in the storage device (not shown).

In a step SD1 shown in FIG. 5, the client 80 loads display service information (described in XML) from the storage device. In a step SD2, the client 80 loads DTD relating to the service information from the storage device. This DTD defines a tag for the service information (in XML) and is stored in the storage device in advance. In a step SD3, the client 80 reads DSSSL for service information display from the storage device (not shown). This DSSSL defines a document style corresponding to the service information. In a step SD4, the service information loaded in the step SD1 is displayed on the SVP browser 81 according to DSSSL.

Figure 6:
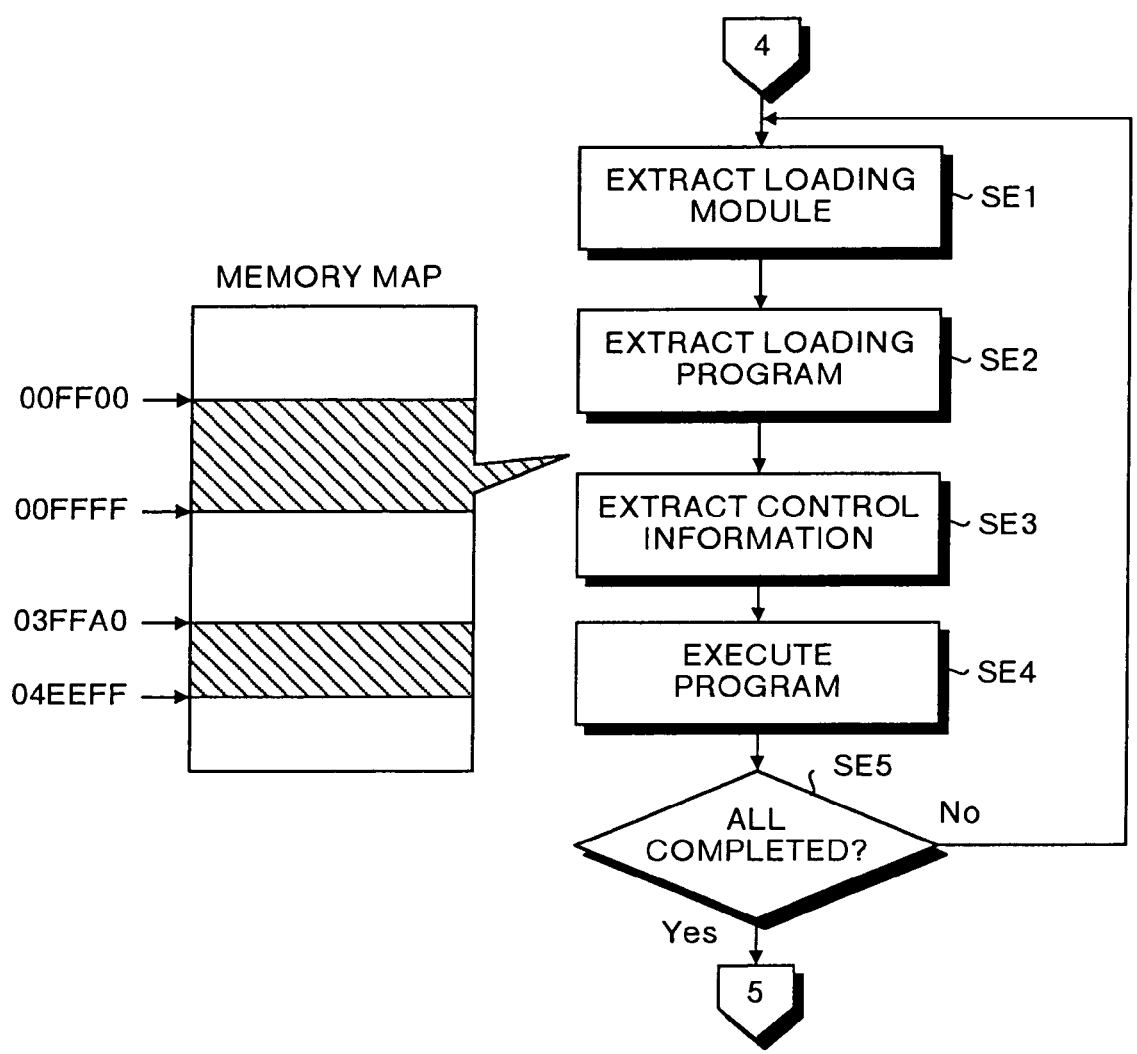
FIG. 6 is a flow chart for describing a loading browser processing in this embodiment.

If "loading browser" is selected, the client 80 outputs the judgment result of the step SA7 shown in FIG. 2, "Yes", and executes a loading browser processing shown in FIG. 6. In this loading browser processing, the client 80 (SVP browser 81) functions as a console for the service processor 70. The client 80 has a function of loading a loading module, a loading program and control information.

The loading module is to load software and firmware stored in the storage device 51 through the Internet 20. The loading program is software or firmware stored in the storage device. The control information is one for controlling the execution of the loading program and has the designation of data write address, a skip address and the like described in XML.

That is, in a step SE1 shown in FIG. 6, the client 80 (SVP browser 81) extracts a loading module from the storage device 51 through the Internet 20 and the program server 50. To be specific, the client 80 extracts a loading module from addresses "00FF00" to "00FFFF" and addresses "03FFA0" to "04EFFF" on a map shown in FIG. 6 according to the loading module. In a step SE2, the client 80 (SVP browser 81) extracts the loading program from the storage device 51 through the Internet 20 and the program server 50.

In a step SE3, the client 80 (SVP browser 81) extracts control information from the storage device through the Internet 20 and the program server 50. In a step SE4, the service processor 70 executes the loading program in accordance with the control information. In a step SE5, it is judged whether or not the execution of all loading programs has been completed. If this judgment result is "No", processings after the step SE1 are repeated.

As described above, according to one embodiment of the present invention, the client 80 having the console function for the service processor 70 and connected to the Internet 20 is provided, and component information (drawing information, various EC sheet information and the like), control information for controlling at least the hardware state of the host 90 and setting information for setting the hardware state are extracted through the SVP browser 81. Thus, compared with a conventional case where component information is delivered and maintained by paper mediums and the like, delivery and maintenance can be conducted with less labor and lower cost and latest component information can be easily obtained due to the interactive characteristics of the Internet 20. Further, according to one embodiment of the present invention, it is not necessary to store conventionally-used paper mediums in great volume in a warehouse and it is not, therefore, necessary to dispose of bad resources of paper mediums.

Furthermore, according to one embodiment of the present invention, the client 80 provided with the SVP browser 81 instead of the conventional console 3 controls the service processor 70. This can enhance versatility with respect to control over the service processor 70.

Moreover, according to one embodiment of the present invention, component information is described in XML. Due to the characteristics of XML, therefore, various types of component information can be easily structuralized.

Additionally, according to one embodiment of the present invention, by providing another client (not shown) connected to the Internet 20 with a browser having the same function as that of the SVP browser 81, control relating to the service processor 70 can be executed by another client through the Internet 20.

Furthermore, according to one embodiment of the present invention, information on the service processor 70 is controlled using the XML defining a data type (e.g., binary, hexadecimal, decimal) by a tag. Thus, the use of XML can be extended to a data processing.

Further, according to one embodiment of the present invention, a program, a loading module and control information are extracted from the program server by way of the SVP browser 81 corresponding to XML through the Internet 20. Thus, compared with the conventional case, the execution of the program can be conducted at low cost, instantly and easily.

One embodiment of the present invention has been described so far with reference to the accompanying drawings. It should be noted that concrete examples of the constitution of the invention are not limited to one embodiment. Even if there are design changes and the like within the range in which the scope and spirit of the present invention are not deviated, these changes are included in the present invention. For example, in one embodiment described above, the service processor control program for realizing the function of the client 80 (SVP browser 81) may be recorded on a computer-readable recording medium and the service processor control program recorded on this recording medium may be read and executed by a computer.

This computer consists of a CPU executing a service processor control program, input devices such as a keyboard, a mouse and the like, an ROM (Read Only Memory) storing various data, an RAM (Random Access Memory) storing operation parameters and the like, a reader reading the service processor control program from a recording medium, output devices such as a display, a printer and the like, and a bus connecting the respective parts of the computer.

The CPU reads the service processor control program recorded on the recording medium through the reader and then executes the service processor control program, thereby conducting the above-stated control. The recording medium may be not only a portable type recording medium such as an optical disk, a floppy disk, a hard disk and the like but also a transmission medium such as a network for temporarily holding data.

As described so far, according to the invention of the first aspect, the client having the console function for the service processor and connected to the Internet is provided, and component information, control information and setting information are extracted through the browser. Thus, compared with a conventional case where component information is delivered and maintained by paper mediums and the like, delivery and maintenance can be advantageously conducted with less labor and lower cost and latest component information can be advantageously, easily obtained due to the interactive characteristics of the Internet. Further, according to the invention of the first aspect, it is not necessary to store conventionally-used paper mediums in great volume in a warehouse and it is, therefore, advantageously unnecessary to dispose of bad resources of paper mediums.

Furthermore, according to the invention of the second aspect, the client provided with the browser instead of the conventional console 3 sets and controls the hardware state of the host. This can advantageously enhance versatility with respect to service processor control.

Moreover, according to the invention of the third aspect, component information is described in XML. Due to the characteristics of XML, therefore, various types of component information can be advantageously, easily structuralized.

Additionally, according to the invention of the fourth aspect, by providing another client connected to the Internet with a browser, control relating to the service processor can be advantageously executed by another client through the Internet.

Furthermore, according to the invention of the fifth aspect, service processor information control is executed using the XML defining an information type (e.g., binary, hexadecimal, decimal) by DTD. Thus, the use of XML can be advantageously extended to an information processing.

According to the invention of the sixth aspect, the hardware state of the host is displayed by a predetermined type of information by using DTD and DSSSL. Thus, the use of XML can be advantageously extended to display control relating to the service processor.

According to the invention of the seventh aspect, the setting information of a predetermined type is written into the hardware of the host by using DTD and DSSSL. Thus, the use of XML can be advantageously extended to control for writing information into the hardware.

According to the invention of the eighth aspect, the message from the host is displayed while being scrolled up or down by using DTD and DSSSL. Thus, the use of XML can be advantageously extended to host message display control.

Further, according to the invention of the ninth aspect, a program, a loading module and control information are extracted from the program server by way of the browser corresponding to XML through the Internet. Thus, compared with a conventional case, the execution of the program can be conducted at low cost, instantly and easily.

According to the invention of the tenth aspect, component information, control information and setting information are extracted through the browser. Thus, compared with a conventional case where component information is delivered and maintained by paper mediums and the like, delivery and maintenance can be advantageously conducted with less labor and lower cost and latest component information can be advantageously, easily obtained due to the interactive characteristics of the Internet. Further, according to the invention of the ninth aspect, it is not necessary to store conventionally-used paper mediums in great volume in a warehouse and it is, therefore, advantageously unnecessary to dispose of bad resources of paper mediums.

Further, according to the invention of the eleventh aspect, control relating to the service processor is conducted through the browser instead of the conventional console 3. Thus, versatility relating to service processor control can be advantageously enhanced.

In addition, according to the invention of the twelfth aspect, service processor information control is executed using the XML defining an information type (e.g., binary, hexadecimal, decimal) by DTD. Thus, the use of XML can be advantageously extended to an information processing.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A service processor control system comprising:
 a component information storage server storing component information on all of hardware and firmware constituting a product, control information for controlling at least a hardware state of a host and setting information for setting the hardware state, and connected to the Internet;
 a first client connected to a service processor connected to said host and said Internet, having at least a maintenance service function, as a console function for said service processor, based on said control information and said setting information, and drawing said component information, said control information and said setting information through a browser; and
 a second client connected to the Internet and having the browser,
 wherein
  the first client and the second client are configured to receive the component information from the component information storage server,
  the first client and the second client are configured to execute control relating to said service processor through said browser, thereby setting and controlling the hardware state of said host based on said control information and said setting information,
  said component information, said control information, and said setting information are described in XML and said browser supports XML, and
  the first client and the second client are configured to execute control over information on said service processor using XML including a tag for defining a type of information on hardware of said host by document type definition (DTD), the type of information being binary.

2. The service processor control system according to claim 1, wherein
 the first client and the second client are configured to display said hardware state by a predetermined type of information by using said DTD and DSSSL.

3. The service processor control system according to claim 2, wherein
 the first client and the second client are configured to write said setting information of a predetermined type into said hardware of said host by using said DTD and DSSSL.

4. The service processor control system according to claim 2, wherein
 the first client and the second client are configured to display a message from said host by scrolling up or down the message by using said DTD or DSSSL.

5. The service processor control system according to claim 1, wherein
 the service processor control system comprises a program server connected to said Internet, storing a program, a loading module for loading said program and control information for controlling execution of said program; and
 the first client and the second client are configured to extract said program, said loading module and said control information by way of said browser through the Internet and then to execute said program.

6. The service processor according to claim 1, further comprising:
 a loading module loading a program to the first client and the second client and which is automatically executed according to an instruction protocol scanned in at the first client or the second client.

7. A computer-readable recording medium recording a service processor control program, connected to a service processor and adapted to a first client connected as a console for at least said service processor and a second client connected to the Internet, said service processor connected to a component information server storing component information on all hardware and firmware constituting a product, control information for controlling at least a hardware state of a host and setting information for setting the hardware state through the Internet and connected to said host, wherein said computer-readable recording medium allows a computer to execute:
 extracting said component information, said control information and said setting information through a browser executed by the first client and the second client,
 wherein
  the first client and the second client receive the component information from the component information storage server,
  the first client and the second client are configured to execute control relating to said service processor through said browser, thereby setting and controlling the hardware state of said host based on said control information and said setting information,
  said component information, said control information, and said setting information are described in XML and said browser supports XML, and the first client and the second client are configured to execute control over information on said service processor using XML including a tag for defining a type of information on hardware of said host by documentation type definition (DTD), the type of information being binary.

8. A service processor control system comprising:

a component information storage server storing component information of hardware and firmware relating to a product, control information for controlling a hardware state of a host and setting information for setting the hardware state, the component information storage server being connected to the Internet; and a first client connected to a service processor connected to the host and to the Internet, performing a maintenance service function including a console function for said service processor, based on said control information and said setting information, and displaying the component information, the control information and the setting information through a browser; and a second client connected to the Internet and having the browser, wherein the first client and the second client send a first set of the component information to the component information storage server, and the first client and the second client receive a second set of the component information from the storage server, the first client and the second client are configured to execute control relating to said service processor through said browser, thereby setting and controlling the hardware state of said host based on said control information and said setting information, said component information, said control information, and said setting information are described in XML and said browser supports XML, and the first client and the second client are configured to execute control over information on said service processor using XML including a tag for defining a type of information on hardware of said host by document type definition (DTD), the type of information being binary.

9. The service processor control system according to claim 8, wherein the component information is created during a process of manufacturing a product.

* * * * *